(12) United States Patent
Wolfson et al.

(10) Patent No.: US 11,595,212 B2
(45) Date of Patent: Feb. 28, 2023

(54) SECURE APPROVAL CHAIN FOR RUNTIME PROTECTION

(71) Applicant: EMC IP Holding Company LLC, Hopkinton, MA (US)

(72) Inventors: Kfir Wolfson, Beer Sheva (IL); Jehuda Shemer, Kfar Saba (IL); Stav Sapir, Beer Sheva (IL); Naor Radami, Shokeda (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 179 days.

(21) Appl. No.: 17/069,436

(22) Filed: Oct. 13, 2020

(65) Prior Publication Data

US 2022/0116216 A1 Apr. 14, 2022

(51) Int. Cl.
| | |
|---|---|
| *H04L 9/32* | (2006.01) |
| *H04L 9/30* | (2006.01) |
| *H04L 9/14* | (2006.01) |
| *G06F 21/51* | (2013.01) |
| *G06F 21/53* | (2013.01) |
| *H04L 9/08* | (2006.01) |

(52) U.S. Cl.
CPC ............ *H04L 9/3213* (2013.01); *G06F 21/51* (2013.01); *G06F 21/53* (2013.01); *H04L 9/14* (2013.01); *H04L 9/30* (2013.01); *H04L 9/3236* (2013.01); *H04L 9/3242* (2013.01); *H04L 9/3247* (2013.01); *H04L 9/088* (2013.01)

(58) Field of Classification Search
CPC . H04L 9/3213; H04L 9/14; H04L 9/30; H04L 9/3242; H04L 9/3247; H04L 9/3236; H04L 9/088; G06F 21/51; G06F 21/53; G06F 21/572
See application file for complete search history.

(56) References Cited

U.S. PATENT DOCUMENTS

| | | | | |
|---|---|---|---|---|
| 11,196,628 | B1* | 12/2021 | Shen | H04L 43/026 |
| 11,238,377 | B2* | 2/2022 | Polleri | H04L 9/088 |
| 2005/0097060 | A1* | 5/2005 | Lee | G06Q 20/045 |
| | | | | 705/65 |
| 2012/0102485 | A1* | 4/2012 | Goldman | G06F 9/44526 |
| | | | | 717/176 |
| 2015/0199188 | A1* | 7/2015 | Mantripragada | G06F 8/60 |
| | | | | 717/101 |
| 2015/0256341 | A1* | 9/2015 | Ye | H04L 9/321 |
| | | | | 713/164 |
| 2017/0351862 | A1* | 12/2017 | Mohinder | G06F 21/57 |
| 2018/0268130 | A1* | 9/2018 | Ghosh | G06F 21/53 |
| 2019/0332777 | A1* | 10/2019 | Edwards | H04L 9/14 |
| 2019/0362093 | A1* | 11/2019 | Horst | G06F 16/2455 |
| 2020/0084044 | A1* | 3/2020 | Dasen | H04L 9/50 |
| 2020/0098027 | A1* | 3/2020 | Serrano | G06Q 30/0619 |
| 2020/0167473 | A1* | 5/2020 | Polyakov | G06F 21/54 |

(Continued)

*Primary Examiner* — Cheng-Feng Huang
(74) *Attorney, Agent, or Firm* — Workman Nydegger (57) ABSTRACT

A secure approval chain for runtime protection is disclosed. As an application or pod is developed in a pipeline, an approval engine ensures that the pod is approved by all approvers. The approval engine generates a deployment token that is added to the configuration data of the pod and that can be used at deployment to perform various security operations including pod verification, runtime environment control and enforcement, and pod or application verification.

16 Claims, 5 Drawing Sheets

(56) References Cited

U.S. PATENT DOCUMENTS

| | | | |
|---|---|---|---|
| 2020/0177373 A1* | 6/2020 | Komandur | H04L 9/3247 |
| 2020/0257810 A1* | 8/2020 | Vrabec | H04L 63/20 |
| 2020/0285761 A1* | 9/2020 | Buck | G06F 21/604 |
| 2021/0067512 A1* | 3/2021 | Polepalli Yeshwanth | H04L 63/10 |
| 2021/0081196 A1* | 3/2021 | Polleri | G06F 16/9024 |

* cited by examiner

SECURE APPROVAL CHAIN FOR RUNTIME PROTECTION

FIELD OF THE INVENTION

Embodiments of the present invention generally relate to data protection. More particularly, at least some embodiments of the invention relate to systems, hardware, software, computer-readable media, and methods for data protection operations including development pipeline operations, deployment operations, security operations, and runtime operations.

BACKGROUND

CI/CD (Continuous Integration/Continuous Delivery or Deployment—referred to herein as a pipeline) is a method for continuously delivering applications. A pipeline is typically configured to automate the process of delivering software and allows multiple builds to be generated, tested, validated, and the like. A pipeline may include many steps or stages from building an application to the running the application in a runtime environment.

The pipeline may have many stages. By way of example only, applications are compiled, packaged, and scanned for threats (e.g., source and binaries) in a typical pipeline. The pipeline may also perform configuration checks, perform run-time vulnerability scans, deploy the application, and use data protection techniques.

However, there is often room for improvement in the pipeline. Stated differently, pipelines may have gaps with respect, by way of example only, to various stages including security and deployment. The problem faced by entities that use pipelines is how to identify and effectively resolve or remedy the gaps. In addition, the remedies should integrate into the pipeline efficiently.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to application development and data protection and security. More particularly, at least some embodiments of the invention relate to systems, hardware, software, computer-readable media, and methods, by way of example only, for data protection operations, security operations, and deployment operations for automated pipelines such as CI/DC pipelines.

A pipeline, such as a CI/CD pipeline, shepherds an application from source code to an application (e.g., a pod or container). The output of the application can often be run in a pod or containerized environment (e.g., Kubernetes). The pipeline may be configured to provide or perform different types of protection and verifications such as, by way of example only, static code analysis on sources, scans of binaries, checks for vulnerabilities in libraries and open source code, OS (Operating System) vulnerabilities, sandboxes for runtime analysis, verification, code signatures to protect against injection and tampering, and access control and protection of image repositories.

A pipeline includes stages and different checks are performed at different stages. As an application passes through the pipeline, the source code is gradually converted into a runnable and approved application. The end result or output of the pipeline may be an image that can be stored in an image repository. The images or pods can be pulled from the repository to run on or in an approved runtime environment such as Kubernetes. Kubernetis.io is an example of a container orchestration and is incorporated by reference in its entirety.

The protections and verifications associated with a pipeline can vary in scope and strength. Embodiments of the invention help improve existing protections or verifications and/or overcome or close security gaps that may be present in a pipeline. For example, some organizations may use pipelines that are heavily regulated and controlled due in part to the nature of the applications being developed. In these pipelines, any build of an application that is to go live, in addition to various protections and verifications, must also go through a chain of approvers (e.g., technical, managerial, or other stakeholders) prior to deployment in a production environment.

Embodiments of the invention relate to an approval engine to ensure that all approvers approve the application and ensure that the runtime environment is also approved and satisfactory. For example, even though an application is scanned with multiple tools and in multiple manners, the application may be deployed to an unapproved environment due to issues with compromised versions, topology, or weak configuration operations. Embodiments of the invention relate to a pipeline that overcomes security gaps in the pipeline itself and in the runtime environment.

Figure 1A:
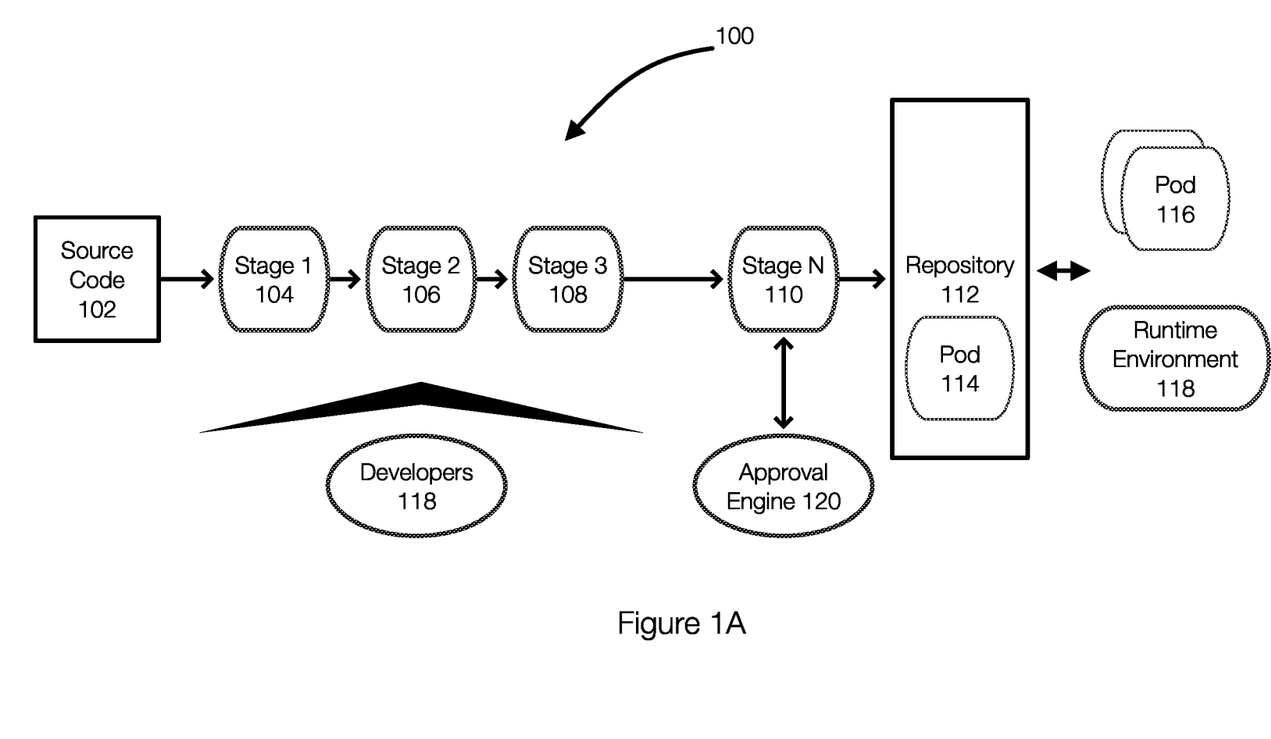
FIG. 1A illustrates an example of a pipeline that includes an approval engine.

FIG. 1A illustrates an example of a pipeline that is associated with an approval engine. The pipeline 100 includes stages such as stages 1-N illustrated as stages 104, 106, 108 and 110. The stages 104, 106, 108 and 110 operate to convert source code 102 into an application that is stored in a repository 112 as a pod 114. The pod 114 may deployed a runtime environment 116 as the pod 116. Thus, the pipeline 100 can produce valid images (e.g., container or pod images) may be stored in the repository 112 and that can be instantiated in an approved runtime environment.

The pipeline 100 is typically managed or controlled by developers 118. The developers 118 may be a team of engineers that make sure the stages 104, 106, 108, 110 of the pipeline 110 are running and that operations performed in the pipeline 100 are up-to-date and secure. Embodiments of the invention further relate to an approval engine 120 that is related, by way of example only, to stage N 110 to ensure that the application has been properly approved. The approval engine 120 may interact with various approvers to ensure that the application is approved by all of the approvers. This is an example of an approval engine 120 that implements an approval chain, such that each approver may approve the application prior to storage in the repository 112 and/or prior to deployment. Some of the features implemented by the approval engine 120 may be validated when the pod 114 is deployed to the runtime environment 118.

In one example, it is assumed that the initial stages of the pipeline 100, which includes scans, measures to ensure that the application or image does not contain malicious code, and other verifications/protections has been performed. The approval engine 120 typically starts after the stages prior to the stage N 110 have been completed.

A large number of builds may be performed in the pipeline 100 on a regular basis. A small fraction of these builds typically reach a live or production environment. The approval engine 120 is configured to ensure that only approved images are stored and/or deployed. This is in addition to ensuring that all testing has been passed (some of which may not be automated) by the application and that all functionality is provided by the application.

The approval engine 120, and other components disclosed herein ensure that the image is approved, that the runtime environment is correct and approved, and that no unapproved pods or instances are running in the target namespace or target environment.

The approval engine 120 is configured to ensure that all approvers, which may be real people, approve each build that is to go live or be deployed in a runtime environment. Embodiments of the invention further ensure that unapproved pods running in the runtime environment 116 can be identified and terminated. Further, the ability to distinguish between approved and non-approved pods or images is implemented in a manner that is very difficult to falsify. Further, embodiments of the invention are able to designate the runtime environment in which an approved application can run and to enforce this requirement at runtime.

The approval engine 120 is thus configured to operate in conjunction with or as part of the pipeline 100. The following components of or associated with the approval engine 120 are introduced and may be used by the approval engine 120 and or in other operations related to the pipeline 100, or the runtime instances and/or runtime environment.

The approval engine 120 is associated with various tuples, tokens, and methods to improve the security of the pipeline 100. An example of a tuple used by the approval engine 120 is a pod security tuple or security tuple.

Figure 1B:
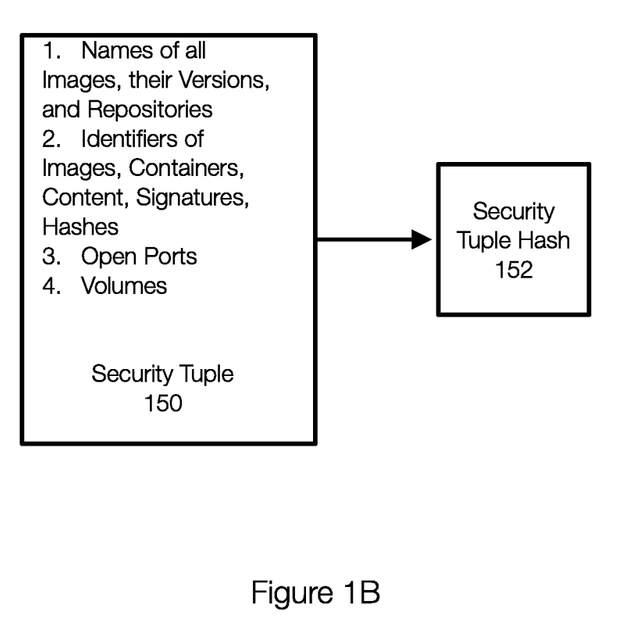
FIG. 1B illustrates an example of a security tuple that may be used in conjunction with a pipeline.

FIG. 1B illustrates an example of a security tuple. The security tuple 150 is hashed to generate a security tuple hash 152. The security tuple hash may be used during various validations or verifications of the pod. As discussed herein, verification or validation of the pod may include validation or verification of a single image or container or a pod, which may include multiple images.

The security tuple 150 includes a set of fields that uniquely identify a pod. As illustrated in FIG. 1B, the fields in the set of fields may include and by way of example only, the fields may include names of all images in the pod, their versions and repositories (default repositories may not be allowed), identifiers of images/containers/content/signatures/hashes, open ports, volumes, or the like or combination thereof.

More specifically, the security tuple 150 may be a data structure that identifies exactly what the pod containers are using versions of the images in the pod, and other security related configuration information. The set of fields uniquely identify the pod and the security tuple hash 152 can be used to ensure that components of the pod cannot be added, removed, or altered. This further ensures that anything passing through the pipeline reaches the production environment in its entirety and unaltered.

To generate the security tuple hash 152, by way of example, the set of fields can be combined, for example by appending or concatenating the fields together. The hash 152 is generated or derived from the appended or concatenated fields. When the pod is deployed, the security tuple hash 152 can be recreated by a webhook or other process to ensure that components of the have not been tampered with. The webhook or other process may generate the hash using the same fields.

An approver is an entity (person or component) whose approval is required in order to allow a pod to be released to production or storage. The approver has or is associated with an approver private key.

A signing key pair is a key pair used, by way of example, for verified runtime signing. The runtime environment may require access to the public key of the signing key pair.

Figure 1C:
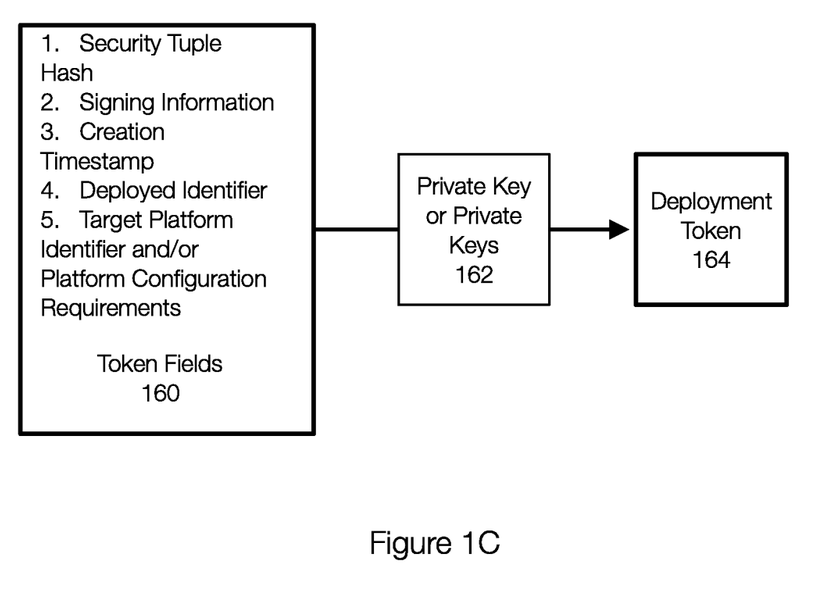
FIG. 1C illustrates an example of a deployment token that may be used in conjunction with a pipeline.

FIG. 1C illustrates an example of a deployment token. The deployment token is associated with token fields 160, which may include the security tuple hash, signing information, a creation timestamp, a deployed identifier, a target platform identifier, platform configuration requirements and the like. The token fields 160, may be appended to each other or concatenated and are cryptographically signed with a private key or private keys 162 to generate the cryptographically signed deployment token 164. During approval, the deployment token 164 may be provided or added to the pod being approved. A pod requires a valid and signed deployment token in order to run successfully in the runtime environment.

The deployment token 164 serves as proof that a pod is approved for running on a particular platform or platform configuration. The platform or platform configuration may be selected or set in accordance with an internal deployment policy.

The deployment token 164, because it is signed with the private key of an approver that has approved the pod, can be used to ensure that the deployment token is not tampered with and that the approver has approved the pod for deployment.

The security tuple hash 152, which is included in the deployment token 164, establishes a relationship between the security tuple hash 152 and the deployment token 164 and ties or relates the deployment token to a specific pod or application.

The deployment token 164 can be verified using the approver's public key. When using the approver's public key, the fields used to generate the security tuple hash 152 are used to generate another hash. Once the approver's public key is used to access the security tuple hash 152 in the deployment token 164, the hash generated from the same fields used to generate the security tuple hash 152 are hashed. If the hash generated in this manner matches the hash of the security tuple found in the deployment token, the pod is verified and is the correct pod that was approved by the approver. In addition, the target platform information in the deployment token 164 can be used to ensure that the target platform or target platform configuration is acceptable. In one example, the target platform or target platform configuration must match the target platform or target platform configuration found in the deployment token 164. The other fields represented in the deployment token can be similarly used for verification or validation purposes.

Another security feature used for security operations for a pipeline or a pod is a webhook. A webhook is a callback from the runtime environment. The webhook allows the pod to be validated and/or authorized. After the webhook authorizes the pod, information is added to the pod configuration information that is needed to decrypt the pod.

A node verification service is an external service/process/pod/module that verifies that all pods running on the node are valid. The node verification service may also be used part of the pod decryption flow. The node verification service supplies a decryption key or part thereof to the pod that needs to be decrypted. In one example, the node verification service performed is part of a pod decryption process. The node verification service provides the pod with the needed decryption keys and ensures than no unauthorized pods are running in the namespace. The node verification services may be implemented as a pod or process and should have access to the platform pod configuration information.

More specifically, valid pods contain a deployment token as previously described. The node verification service examines the pod configuration and if no deployment token is present or if the token signature does not validate, the pod is terminated. When the node verification service examines a pod running in the runtime environment, unauthorized pods can be identified and terminated in a similar manner. Authorized pods are decrypted and allowed to run in the runtime environment.

An approval engine is configured to implement the approval chain by creating a signed deployment token. The approval engine retrieves the security tuple and the other deployment token (e.g., information from the fields associated with the deployment token). The approval engine may contact an approver to have the deployment token signed with the approver's private key. In one example, the approval engine may have a copy of the private key and the use of that key may be authorized by a password or by the approver providing a part of the key. The signed deployment token may be placed in the pod configuration and/or in the repository.

Figure 2:
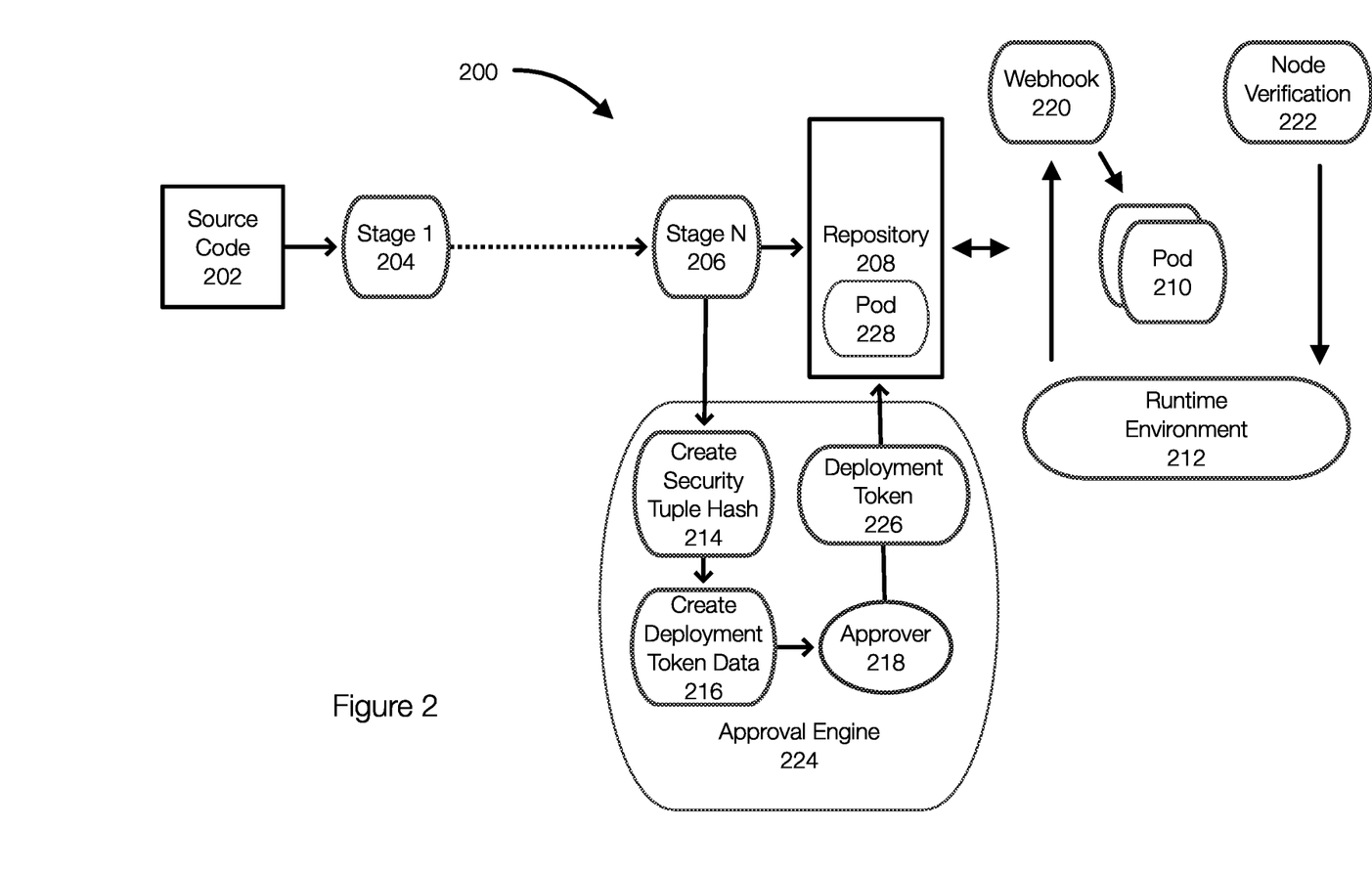
FIG. 2 illustrates another example of a pipeline that includes an approval engine and other security components.

FIG. 2 illustrates an expanded view of a pipeline. The pipeline 200 is an example of the pipeline 100. The pipeline 200 operates on or processes source code 202 such that the source code 202 passes through or is processed in the pipeline 200 beginning with stage 1 204. At the stage N 206, before the pod is provided to or deployed to the repository 208, the approval engine 224 operates to ensure that the pod or application is approved. The approval engine 224 is, in one example, part of the pipeline 200 and part of stage N.

Generally, the approval engine 224 is configured to generate a signed deployment token 226 that is added to a configuration of the pod 228 being processed or approved. The approval engine 224 may create 214 or access the security tuple hash, for example as illustrated in FIG. 1B. the approval engine 224 may then create 216 or collect the deployment token data such that the deployment token data or fields include, by way of example only, the fields illustrated in FIG. 1C.

Next, the deployment token is passed to the approvers 218 and the deployment token 226 is generated by signing the deployment token data 216 with the private key of the approver 218. The approval engine 224 may ensure that all approvers sign the deployment token data 216 in some form. An example for multiple approvers is discussed later in this disclosure. The cryptographically signed deployment token 226 is then included in or added to the configuration information of the pod 228, which is stored in the repository 08.

When the pod 228 is deployed in the runtime environment 212 (e.g., as the pod 210), the webhook 220 verifies the signed deployment token 228 as previously described. This may include generating a hash from the fields associated with the security tuple and comparing that hash to the security tuple hash included in the deployment token. The pod 210 is allowed to run only if the deployment token is valid. If the deployment token 226 is valid, the webhook 220 modifies the configuration data of the pod 210 by adding decryption key data to the configuration data of the pod.

The node verification 222 uses the information included in the configuration data, including the information added by the webhook 220, to perform additional verification and validations.

For example, the node verification 222 is able to detect authorized and/or unauthorized pods in the runtime environment 212. The node verification 222 is also able to provide authorized pods with any necessary decryption keys.

For example, the node verification 222 may use the information in the pod configuration information to determine that the pod is valid. Unauthorized pods on the runtime environment 212 or node are terminated. Authorized pods, such as the pod 210, are provided with a decryption key by the node verification 222 only if a valid deployment token exists. The node verification 222 supplies the decryption key needed for decryption and requires the decryption key parts that were added by the webhook 220.

Figure 3:
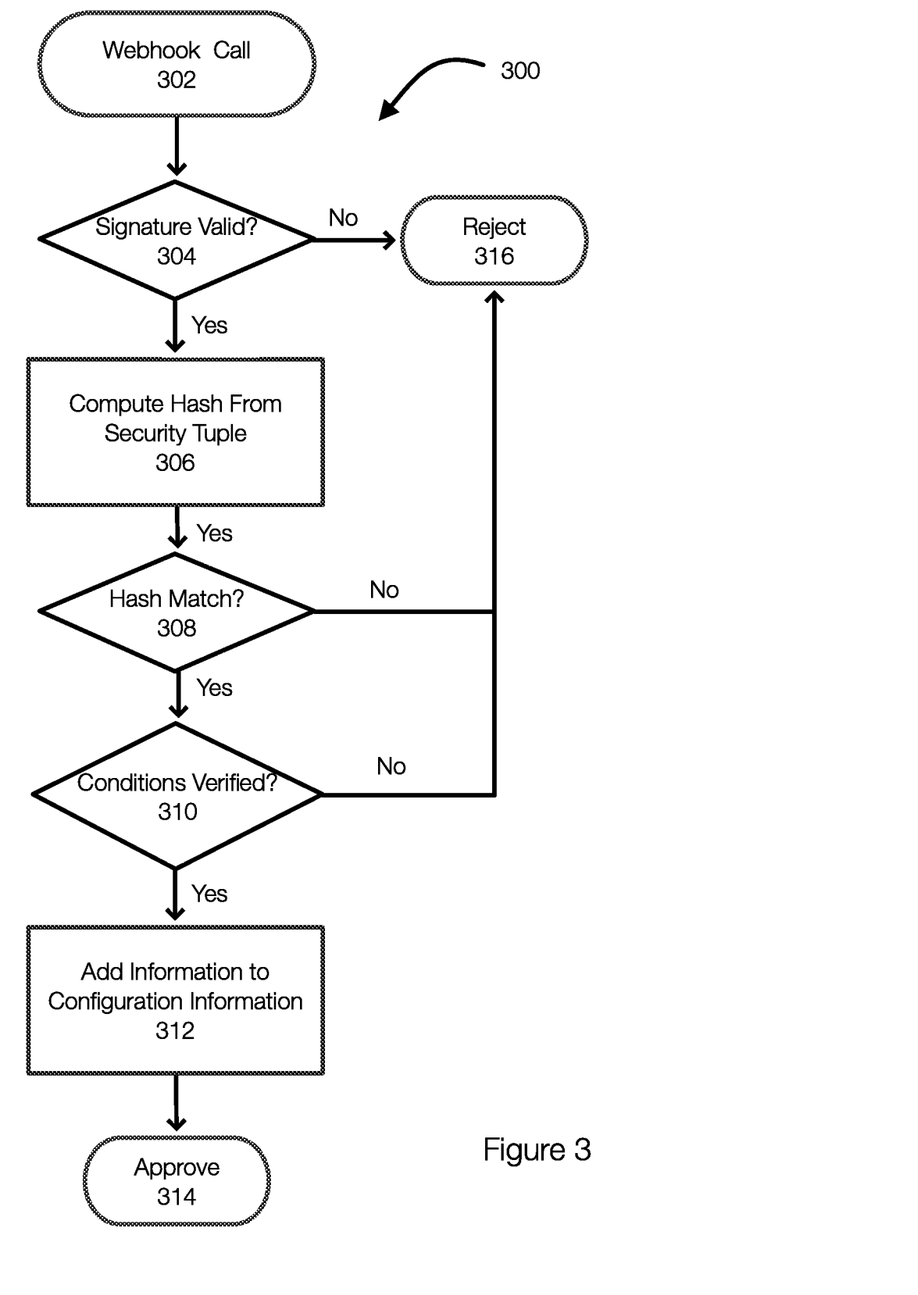
FIG. 3 illustrates an example of a pipeline related operation.

FIG. 3 illustrates an example of a webhook or of a process performed by a webhook. The webhook call 302 is made, for example, by the runtime environment. The method 300 then determines whether the signature is valid. For example, if the deployment token can be decrypted by the approver's public key, the signature is valid. If the signature is not valid (No), the pod is rejected 316.

If the signature is valid, a hash of the fields associated with the security tuple is computed 306. If the computed hash matches the hash from the deployment token, the hash is valid (Yes) at 308. If the comparison fails, the pod is rejected 316.

Next, the method 300 may verify 310 the conditions set forth in the deployment tuple. For example, does the target platform or target platform configurations match or satisfy the conditions set forth in the deployment tuple? If no at 310, the pod is rejected. If yes at 310, information is added 312 to the configuration information. The added information may include a key for decryption or parts of a key for decryption. This key or parts thereof may be used by the node verification.

Finally, the pod is approved 314 by the webhook method 300 if the signature is valid, the security tuple hash is verified, and the conditions in the deployment token are satisfied.

Figure 4:
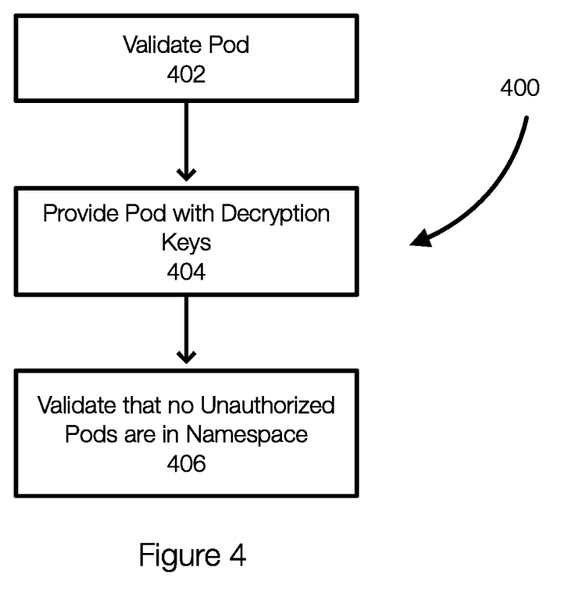
FIG. 4 illustrates a webhook method for validating a pod.

FIG. 4 illustrates an example of a method for node verification. In the method 400, a pod may be validated 402. For example, if the token signature validates, the pod may be validated from the perspective of the method 400. As previously stated, the webhook method 300 performed additional verification.

By validating 402 the pod, the method 400 can the provide 404 the pod with decryption keys. The node verification method 400 can also ensure 4065 that only authorized pods are running. Unauthorized pods or those pods whose deployment token signature does not validate are terminated in the namespace.

Figure 5:
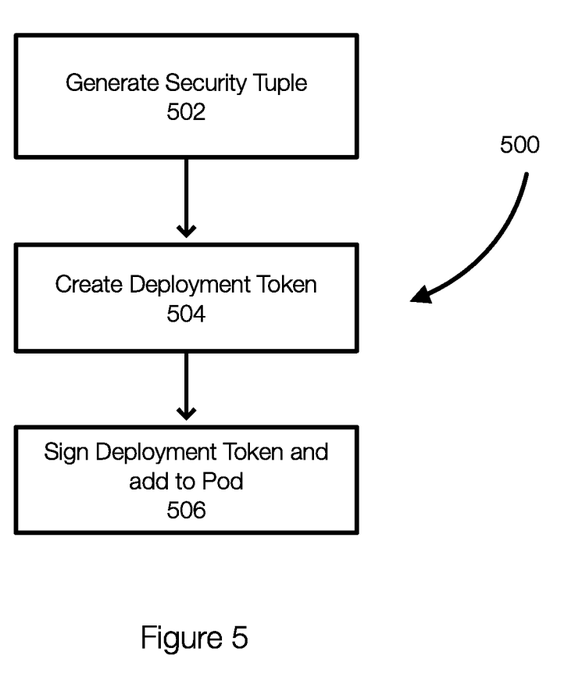
FIG. 5 illustrates an example of a pod approval method.

FIG. 5 illustrates an example method for approving a pod or application in a pipeline. The method 500 is an example of a method to ensure that all approvers approve the application. When a pod or application is ready for approval, a security tuple is generated 502. The security tuple may include various configuration fields that uniquely identify the pod. A hash of the security tuple may also be generated. Next, the deployment token is generated or created 504. The deployment token or deployment token data includes the hash of the security tuple and other fields. The deployment token or deployment token data is then cryptographically signed 506 by all approvers and added to the pod. This approval chain, which may be enforced by the approval engine, may ensure that all approvers sign the deployment token. The deployment token is not added to the configuration data of the pod until all approvers have signed with their private keys.

As previously indicated, the approval engine can ensure or handle multiple approvers. The approval engine may be aware of and enforce various conditions when generating a valid deployment token. For example, the approval engine is aware of all approvers that need to sign the deployment token and all approvers must sign the deployment token in order for the deployment token to be valid. In addition, the approval engine ensures that none of the approvers can be bypassed. In one example, the approval engine prevents approvals and/or the deployment token from being falsified.

In one example, when the signatures of multiple approvers are needed, every approver has their own key pair, and each approver signs the token separately. There is no problem signing a token multiple times. The approval engine can verify all of the signatures using the public keys.

Once all of the signatures are verified, the approval engine will add a signature to the token using an "approval" private key for which the public key is the key used to verify. This ensures that the deployment token is signed by all of the approvers and ensures that, when the deployment token is valid, a single public key can be used. Requiring the webhook, for example, to keep track of the public keys of multiple approvers is subject to error.

The approvals can be tracked because each has a separate signature and time stamp.

In another example, each approver may only have part of the private key or part of a function that results in the private key part. In this case, the private key is generated only if all of the parts are combined together. This ensures that all approvers sign because the private key cannot be generated unless all of the parts are available.

For example, in RSA the public key is A,n when n=pq, which is a multiple of two prime numbers.

The private key is B where A*B=1 mod n.

The encryption is $X=M^A$ mod n and the decryption is $X^B$ mod n.

Note that B (or A) is just a random number. The only requirement is that A*B=1 mod n.

Therefore the private key B can be split into B1*B2*B3* . . . *Bn mod n=B. Alternatively the private key B is split as a string into sections to concatenate so that B1+B2+B3+ . . . +Bn=B. Each approver will have only one part Bi and only the combination of all of the parts together will create the correct private key.

After the private key is generated the scheme continues with signing like with a single approver as previously described.

Embodiments of the invention thus allow for the secure deployment of applications such as pods (e.g., Kubernetes pods). Approvers can be added to the pipeline to ensure that only approved versions of the pods or applications are deployed and run. Further, embodiments of the invention ensure that the target runtime meets certain criteria. A webhook and node verification process are also added that use cryptographic methods to ensure that only valid pods run in the runtime environment.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, pipeline and related operations. More generally, the scope of the invention embraces any operating environment in which the disclosed concepts may be useful. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure®, Amazon Web Services® (AWS), Dell EMC Cloud Storage Services, and Google Cloud. More generally however, the scope of the invention is not limited to employment of any particular type or implementation of cloud computing environment In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

Embodiments may also include containers, pods, and orchestration environments.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method comprising: generating, by an approval engine, a security tuple for a pod that is passing through a pipeline, wherein the security tuple includes first fields, generating, by the approval engine, a deployment token that includes a hash of the security tuple and second fields, cryptographically signing the deployment token using a private key of an approver, and adding, by the approval engine, the cryptographically signed deployment token to configuration data of the pod.

Embodiment 2, the method of embodiment 1, further comprising cryptographically signing the deployment token with multiple private keys associated with corresponding to multiple approvers.

Embodiment 3, the method of embodiment 1 and/or 2, further comprising executing a webhook when the pod is deployed to a runtime environment, wherein the webhook validates the signature of the approver.

Embodiment 4, the method of embodiment 1, 2, and/or 3, further comprising the webhook generating a hash from the first fields and comparing the generated with the hash of the security tuple included in the deployment token, wherein the pod is rejected when the hashes do not match.

Embodiment 5, the method of embodiment 1, 2, 3, and/or 4, further comprising validating conditions for the runtime environment, the conditions including a target platform identifier and target platform configurations.

Embodiment 6, the method of embodiment 1, 2, 3, 4, and/or 5, further comprising adding decryption data to the configuration information of the pod when the webhook validates the pod.

Embodiment 7, the method of embodiment 1, 2, 3, 4, 5, and/or 6, further comprising node verification by providing the pod with decryption keys when the pod is valid and ensuring that only authorized pods operate in the runtime environment.

Embodiment 8, the method of embodiment 1, 2, 3, 4, 5, 6, and/or 7, wherein the approver comprises multiple approvers, the method further comprising generating the deployment token only when the approval engine is aware of all of the multiple approvers, requires all of the approvers to cryptographically sign the deployment token, prevents any of the approvers from being bypassed.

Embodiment 9, the method of embodiment 1, 2, 3, 4, 5, 6, 7, and/or 8, further comprising verifying, all of the signatures using public keys of the approvers.

Embodiment 10, the method of embodiment 1, 2, 3, 4, 5, 6, 7, 8, and/or 9, further comprising deploying the pod to an approved runtime environment.

Embodiment 11. The method as recited in any of embodiments or portions thereof.

Embodiment 12. A method for performing any of the operations, methods, or processes, or any portion of any of these or any combination of these, disclosed herein.

Embodiment 13. A non-transitory storage medium having stored therein instructions that are executable by one or more hardware processors to perform operations comprising the operations of any one or more of embodiments 1 through 12.

Embodiment 14. An apparatus comprising hardware such as a processor and memory, configured to perform the method or operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating, by an approval engine, a security tuple for a pod that is passing through a pipeline, wherein the security tuple includes first fields that uniquely identify the pod;
    generating a hash of the security tuple;
    generating, by the approval engine, a deployment token that includes the hash of the security tuple and second fields;
    cryptographically signing, by all of the approvers, the deployment token, wherein each of the approvers uses a private key to cryptographically sign the deployment token, wherein the approval engine is aware of all of the multiple approvers, requires all of the approvers to cryptographically sign the deployment token, and prevents any of the approvers from being bypassed;

adding, by the approval engine, the cryptographically signed deployment token to configuration data of the pod; and executing a webhook when the pod is deployed to a runtime environment, wherein the webhook validates signatures of the approvers.

2. The method of claim 1, further comprising cryptographically signing the deployment token with multiple private keys associated with corresponding to multiple approvers.

3. The method of claim 1, further comprising the webhook generating a hash from the first fields and comparing the generated hash with the hash of the security tuple included in the deployment token, wherein the pod is rejected when the hashes do not match.

4. The method of claim 3, further comprising validating conditions for the runtime environment, the conditions including a target platform identifier and target platform configurations.

5. The method of claim 4, further comprising adding decryption data to the configuration information of the pod when the webhook validates the pod.

6. The method of claim 5, further comprising node verification by providing the pod with decryption keys when the pod is valid and ensuring that only authorized pods operate in the runtime environment.

7. The method of claim 1, further comprising verifying, all of the signatures using public keys of the approvers.

8. The method of claim 1, further comprising deploying the pod to an approved runtime environment.

9. A non-transitory storage medium having stored therein instructions that are executable by one or more hardware processors to perform operations comprising:

generating, by an approval engine, a security tuple for a pod that is passing through a pipeline, wherein the security tuple includes first fields that uniquely identify the pod;

generating a hash of the security tuple;

generating, by the approval engine, a deployment token that includes the hash of the security tuple and second fields;

cryptographically signing, by all of the approvers, the deployment token, wherein each of the approvers uses a private key to cryptographically sign the deployment token, wherein the approval engine is aware of all of the multiple approvers, requires all of the approvers to cryptographically sign the deployment token, and prevents any of the approvers from being bypassed;

adding, by the approval engine, the cryptographically signed deployment token to configuration data of the pod; and executing a webhook when the pod is deployed to a runtime environment, wherein the webhook validates signatures of the approvers.

10. The non-transitory storage medium of claim 9, further comprising cryptographically signing the deployment token with multiple private keys associated with corresponding to multiple approvers.

11. The non-transitory storage medium of claim 9, further comprising the webhook generating a hash from the first fields and comparing the generated hash with the hash of the security tuple included in the deployment token, wherein the pod is rejected when the hashes do not match.

12. The non-transitory storage medium of claim 11, further comprising validating conditions for the runtime environment, the conditions including a target platform identifier and target platform configurations.

13. The non-transitory storage medium of claim 12, further comprising adding decryption data to the configuration information of the pod when the webhook validates the pod.

14. The non-transitory storage medium of claim 13, further comprising node verification by providing the pod with decryption keys when the pod is valid and ensuring that only authorized pods operate in the runtime environment.

15. The non-transitory storage medium of claim 9, further comprising verifying, all of the signatures using public keys of the approvers.

16. The non-transitory storage medium of claim 9, further comprising deploying the pod to an approved runtime environment.

* * * * *